(12) United States Patent
Shadrin et al.

(10) Patent No.: US 11,425,154 B2
(45) Date of Patent: Aug. 23, 2022

(54) SYSTEM AND METHOD OF DETECTING ANOMALIES IN A TECHNOLOGICAL SYSTEM

(71) Applicant: AO Kaspersky Lab, Moscow (RU)

(72) Inventors: Alexander V. Shadrin, Moscow (RU); Pavel V. Dyakin, Moscow (RU); Dmitry A. Kulagin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 192 days.

(21) Appl. No.: 16/682,027

(22) Filed: Nov. 13, 2019

(65) Prior Publication Data

US 2021/0021623 A1   Jan. 21, 2021

(30) Foreign Application Priority Data

Jul. 17, 2019   (RU) .............................. 2019122436

(51) Int. Cl.
*H04L 9/40*   (2022.01)
*G06F 11/22*   (2006.01)

(52) U.S. Cl.
CPC .............................. *H04L 63/1425* (2013.01)

(58) Field of Classification Search
CPC . H04L 63/1425; H04L 63/1416; H04L 67/22; G06F 21/55; G06F 21/554
See application file for complete search history.

(56) References Cited

U.S. PATENT DOCUMENTS

| | | | |
|---|---|---|---|
| 6,591,306 B1* | 7/2003 | Redlich | H04L 69/161 370/466 |
| 10,356,106 B2* | 7/2019 | Engel | H04L 63/1408 |
| 2006/0242706 A1* | 10/2006 | Ross | G06F 21/55 726/23 |

(Continued)

FOREIGN PATENT DOCUMENTS

WO   2018208715 A1   11/2018

OTHER PUBLICATIONS

Tyagi et al., "Detecting malicious node in network using packet delivery ratio," 2016 3rd International Conference on Computing for Sustainable Global Development (INDIACom) Year: 2016 | Conference Paper | Publisher: IEEE.*

(Continued)

*Primary Examiner* — Roderick Tolentino
(74) *Attorney, Agent, or Firm* — ArentFox Schiff LLP; Michael Fainberg

(57) ABSTRACT

Disclosed herein are systems and methods for detecting anomalies in a technological system. In one aspect, an exemplary method comprises, intercepting, by a duplicator running on an upper-level element of the technological system at least one outgoing data packet addressed to a middle-level element of the technological system, sending, by the duplicator, information about the intercepted at least one outgoing data packet to a monitor using a secure connection, the monitor running on the middle-level element, intercepting, by the monitor, at least one incoming (Continued)

data packet, comparing, by the monitor, the information received from the duplicator with the intercepted at least one incoming data packet, and detecting, by the monitor, an anomaly in the technological system when the intercepted at least one incoming data packet does not conform to the information received from the duplicator.

21 Claims, 5 Drawing Sheets

(56) References Cited

U.S. PATENT DOCUMENTS

| | | | |
|---|---|---|---|
| 2011/0126195 A1* | 5/2011 | Tsirkin | G06F 9/544 718/1 |
| 2013/0036470 A1 | 2/2013 | Zhu | |
| 2014/0189860 A1 | 7/2014 | Hull Roskos | |
| 2016/0021253 A1* | 1/2016 | Petit-Huguenin | H04L 65/00 370/260 |
| 2017/0111272 A1* | 4/2017 | Liu | H04L 45/74 |
| 2017/0244752 A1 | 8/2017 | Gordeychik et al. | |
| 2017/0339177 A1* | 11/2017 | Lorello | H04L 63/1416 |
| 2018/0063072 A1* | 3/2018 | Wackerly | H04L 61/5014 |
| 2018/0139104 A1* | 5/2018 | Seddigh | H04L 41/0213 |
| 2019/0207969 A1 | 7/2019 | Brown | |
| 2020/0076738 A1* | 3/2020 | Rao | H04L 47/125 |

OTHER PUBLICATIONS

Mishra et al., "Out-VM monitoring for Malicious Network Packet Detection in cloud," 2017 ISEA Asia Security and Privacy (ISEASP) Year: 2017 | Conference Paper | Publisher: IEEE.*

* cited by examiner

SYSTEM AND METHOD OF DETECTING ANOMALIES IN A TECHNOLOGICAL SYSTEM

CROSS REFERENCE TO RELATED APPLICATIONS

The present application claims priority to Russian Patent Application No. 2019122436, filed on Jul. 17, 2019, the entire content of which is incorporated herein by reference.

FIELD OF TECHNOLOGY

The present disclosure relates to the field of protection of information, more specifically, to systems and methods of increasing Information Technology (IT) security of technological system. For example, the system and method are directed to detection of anomalies in a technological system.

BACKGROUND

One of the current problems of industrial security is the problem of secure functioning of Technological Processes (TPs). The principal threats to the functioning of TPs include unintentional or malicious actions in operational control, wear and failure of equipment and subunits, computer attacks on control systems and the Information Technology (IT) system, and others.

Automated Control Systems (ACSs) in enterprises control the technological systems. Thus, the ACSs need to be given an adequate level of security. The elements of technological systems, as well as the operating systems and firmware controlling those elements, often become obsolete. Frequent updating of the operating systems and firmware is not possible because the updates would lead to frequent interruptions in the technological processes. Furthermore, newer versions of the programs being updated may also contain defects that negatively impact the functional stability of the elements of the technological systems. Furthermore, existing obsolete ACSs, which are typically designed to stand in isolation, are often connected to computer networks. However, these obsolete ACSs generally do not have the means for ensuring IT security in the event of a malicious action from outside.

A widespread problem in technological systems is the need to use obsolete equipment that uses unprotected or vulnerable information transmission protocols. This is due to the fact that the service life of the equipment in such systems amounts to years or even decades, and during this time the information transmission protocols are able to become obsolete—thereby enabling vulnerabilities to appear as the equipment ages. In addition, replacing equipment that is already operating is a complicated and costly process (and is sometimes impossible). Therefore, security problems often go unsolved and vulnerabilities appear in the control systems of technological processes. A typical control network of technological systems includes elements of various types. The important elements include control computers (servers and client stations for Supervisory Control and Data Acquisition (SCADA)) and Programmable Logic Controllers (PLCs) which directly control the equipment (for example, actuators). The SCADA software is rather easy to update, while the updating of the PLC firmware requires the involvement of the equipment maker and is often an extremely hard problem to solve. In such a situation, hackers have an opportunity to influence the working of the PLC, which may result in serious consequences. For example, the equipment being monitored may malfunction causing disruptions to the technological processes of the technological system as a whole. In some scenario, the consequences may even be catastrophic.

One approach for solving the problems described above is to detect anomalies by performing an analysis of traffic within the data transmission network of the technological system. For instance, the software KICS for Networks of Kaspersky Laboratories describes anomaly detection using such analysis. However, this approach requires a large volume of a priori information about the PLC (e.g., knowledge about protocols and parameter values used by the PLC may be needed). In addition, the detection of anomalies in traffic of complex systems may contain errors, e.g., type I and type II errors (false positives and false negatives).

Thus, there is a need for a more optimal way to detect anomalies in a technological system.

SUMMARY

Aspects of the disclosure relate to the field of information security, more specifically to systems and methods for detecting anomalies in a technological system.

In one exemplary aspect, a method for detecting anomalies in a technological system is implemented in a computer comprising a hardware processor, the method comprising: intercepting, by a duplicator running on an upper-level element of the technological system at least one outgoing data packet addressed to a middle-level element of the technological system, sending, by the duplicator, information about the intercepted at least one outgoing data packet to a monitor using a secure connection, the monitor running on the middle-level element, intercepting, by the monitor, at least one incoming data packet, comparing, by the monitor, the information received from the duplicator with the intercepted at least one incoming data packet, and detecting, by the monitor, an anomaly in the technological system when the intercepted at least one incoming data packet does not conform to the information received from the duplicator.

According to one aspect of the disclosure, a system is provided for detecting anomalies in a technological system, the system comprising a hardware processor configured to: intercept, by a duplicator running on an upper-level element of the technological system at least one outgoing data packet addressed to a middle-level element of the technological system, send, by the duplicator, information about the intercepted at least one outgoing data packet to a monitor using a secure connection, the monitor running on the middle-level element, intercept, by the monitor, at least one incoming data packet, compare, by the monitor, the information received from the duplicator with the intercepted at least one incoming data packet, and detect, by the monitor, an anomaly in the technological system when the intercepted at least one incoming data packet does not conform to the information received from the duplicator.

In one exemplary aspect, a non-transitory computer-readable medium is provided storing a set of instructions thereon for detecting anomalies in a technological system, wherein the set of instructions comprises instructions for: intercepting, by a duplicator running on an upper-level element of the technological system at least one outgoing data packet addressed to a middle-level element of the technological system, sending, by the duplicator, information about the intercepted at least one outgoing data packet to a monitor using a secure connection, the monitor running on the middle-level element, intercepting, by the monitor, at least one incoming data packet, comparing, by the monitor, the information received from the duplicator with the intercepted at least one incoming data packet, and detecting, by the monitor, an anomaly in the technological system when the intercepted at least one incoming data packet does not conform to the information received from the duplicator.

In one aspect, the method further comprises sending, by the monitor, information about the detected anomaly to all upper-level elements of the technological system.

In one aspect, the upper-level element is running in a protected environment and the middle-level element is using an unprotected data transmission protocol.

In one aspect, the method further comprises, by the duplicator, establishing at least one secure connection with each monitor located in the data transmission network, and sending information about each intercepted outgoing data packet to the monitors with which the duplicator has established at least one secure connection.

In one aspect, the monitor is a protected operating system.

In one aspect, the monitor is located in a same data transmission network in which the middle-level element to which the intercepted at least one outgoing data packet is addressed is located.

In one aspect, the upper-level elements of the technological system which operate in a protected environment comprise one or more of: supervisory control and data acquisition (SCADA) and programmable logic controller (PLC) devices.

In one aspect, the method of the present disclosure detects anomalies in a technological system. The method is designed to improve the computer security. Thus, the method of the present disclosure advantageously enables information security of data.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1A:
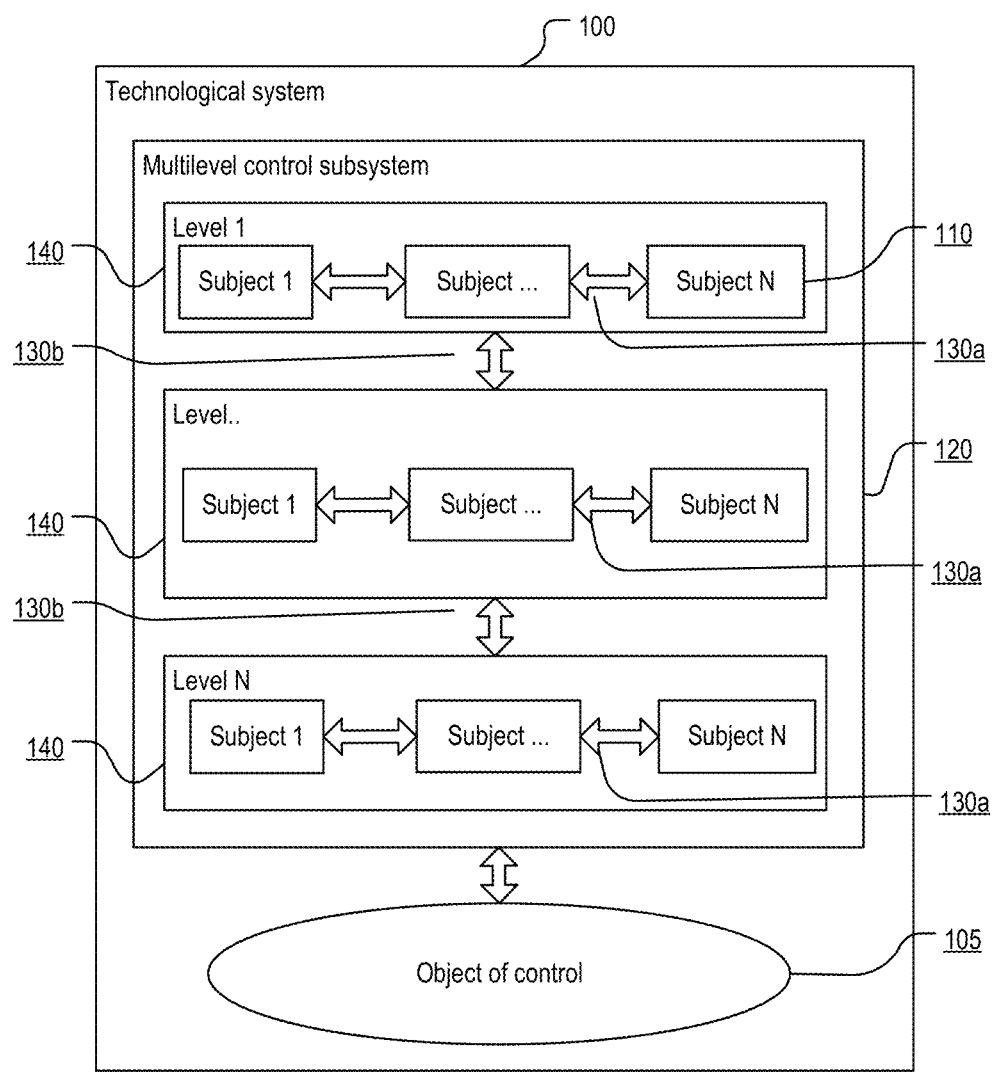
FIG. 1a illustrates an example diagram of a technological system in accordance with aspect of the present disclosure.

Exemplary aspects are described herein in the context of a system, method, and a computer program for detecting anomalies in a technological system. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, a number of terms and concepts, as used in describing various aspects of the disclosure, are defined herein.

An object of control is a technological object subjected to external actions (controlling and/or perturbing) for the purpose of changing its state; in a particular instance, such objects are devices (such as electric motors) or technological processes.

A technological process (TP) is a process of a material production, consisting of sequentially changing states of a material entity (a work object).

The control of a technological process (process control) is a set of methods used to control the technological parameters during the production of an end product.

A technological parameter (process variable, PV) is a current metered value of a particular portion of a TP which is being observed or monitored. A process variable might be, for example, a measurement from a detector.

An external action is a method of changing the state of an element subjected to the action (such as an element of a technological system) in a particular direction, the action being transmitted from one element of the technological system to another element of the technological system in a form of a signal.

The state of an object of control is the totality of its essential attributes, as expressed by parameters of state which are altered or maintained under the influence of external actions, including control actions from a control subsystem.

A parameter of state is one or more numerical values characterizing an essential attribute of an object; in one particular instance, a parameter of state is a numerical value of a physical quantity.

A formal state of an object of control is the state of the object of control corresponding to the process chart and other technological documentation (in the case of a TP) or a timetable (in the case of a device).

A controlling action is a deliberate (the goal of the action is to act on the state of the object), legitimate (provided for by the TP) external action on the part of the control subjects of a control subsystem on an object of control, resulting in a change of state of the object of control or a maintaining of the state of the object of control.

A perturbing action is a deliberate or unintentional illegitimate (i.e., not provided for by the TP) external action on the state of an object of control, including an action on the part of the control subject.

An anomaly is the occurrence of a perturbing action in a technological system.

A control subject is a device which applies a controlling action to an object of control or transmits a controlling action to another control subject for transformation before being applied directly to the object.

A multilevel control subsystem is a group of control subjects that involves several levels.

A cyber-physical system is an IT concept meaning the integration of computing resources into physical processes. In such a system, the detectors, equipment, and IT systems are connected along the entire chain of value creation beyond the boundaries of a single enterprise or business. These systems interact with each other by means of standard protocols for forecasting, feedback, and adapting to changes. Examples of a cyber-physical system are a technological system and an industrial Internet of Things.

The Internet of Things (IoT) is a computer network of physical objects ("things") equipped with built-in technologies for interacting with each other or with the outer world. The Internet of Things includes such technologies as portable devices, electronic systems of means of transportation, smart cars, smart cities, industrial systems, and others.

An Industrial Internet of Things (IIoT) is a subcategory of the Internet of Things which also includes applications oriented to the consumer, such as portable devices, "smart home" technologies and cars with automatic control. A distinguishing feature of both concepts is devices with built-in detectors, machine tools and infrastructure sending data through the Internet and controlled by means of software.

A technological system (TS) is a functionally interrelated group of control subjects of a multilevel control subsystem and an object of control (a TP or a device), realizing through a change in the states of the control subjects a change in state of the object of control. The structure of the technological system is formed by the basic elements of the technological system (the interrelated control subjects of the multilevel control subsystem and the object of control) and the links between these elements.

In the event that the object of control in the technological system is a technological process, the end goal of the control is: to change the state of the work object (raw material, blanks, etc.) by a change in the state of the object of control.

In the event that the object of control in the technological system is a device, the end goal of the control is to change the state of the device (a means of transportation, a spacecraft).

A functional relationship of the elements of the TS refers to a relationship of the states of these elements. It is noted that there may or may not be a direct physical link between the elements. For example, there is no physical link between actuators and a technological operation, yet the cutting speed, for example, is functionally related to the rotational speed of a spindle, even though these parameters of state are not physically connected.

The state of a control subject is the totality of its essential attributes, expressed by the parameters of state, and which can be altered or maintained under the influence of external actions.

The essential attributes (and accordingly the essential parameters of state) of a control subject are attributes having a direct influence on the essential attributes of the state of the object of control.

The essential attributes of the object of control are attributes having a direct influence on the operational factors being controlled (precision, safety, efficacy) for the TS. For example, cutting conditions corresponding to formally specified conditions, the movement of a train corresponding to a timetable, the maintaining of a reactor temperature within permissible limits. Depending on the factors being controlled, one will select the parameters of state of the object of control and accordingly parameters, related thereto, of the states of the control subjects exerting a controlling action on the object of control.

A hypervisor (a monitor of virtual machines) is a program creating an operational environment for other programs (including other hypervisors) by simulating computer hardware and controlling that hardware and the guest operating systems operating in that environment.

In one aspect, the present disclosure describes a system for detecting anomalies in a technological system that is implemented on a computing system (e.g., a server, computer, etc.), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 4). Furthermore, the system components may be realized either within a single computing device or spread out among several interconnected computing devices.

In one aspect, the present disclosure describes a method for detecting anomalies that requires minimal a priori knowledge about the PLCs. The present method increases the level of protection of the technological system by guaranteeing detection of unauthorized interventions in the system. In one aspect, the interaction of the SCADA components with the PLCs protected using a secure connection (for example, using cryptographic protection schemes). Thus, detection of anomalies in a data transmission network is guaranteed. The detection is performed without carrying out a compilation of statistical data and/or checking and filtering network packets for their content (e.g., using DPI (deep packet inspection)). Moreover, the detection of anomalies is performed even in the case when certain elements of the technological system in the data transmission network are using unprotected data transmission protocols. In addition, the method of the present disclosure may also be used to detect malicious actions which may not be part of the TP and are often aimed at disrupting the flows of the TP. In this respect, the method of the present disclosure makes it is possible to provide a protected interaction of the SCADA components with the PLCs, even without modifying the software of the SCADA (e.g., by using virtualization technologies).

FIG. 1a illustrates an example diagram of a technological system 100 in accordance with aspect of the present disclosure. The technological system 100 comprises an object of control 105 and a multilevel control subsystem 120. The multilevel control subsystem 120 includes a plurality of levels 140, e.g., levels 1, 2, . . . , N, with each level comprising any number of control subjects 110. Horizontal links 130a interconnect subjects within a level and vertical links 130b interconnect the various levels, e.g., levels 1 and 2, levels 2 and 3, and the like. The control subjects are grouped by levels 140.

Figure 1B:
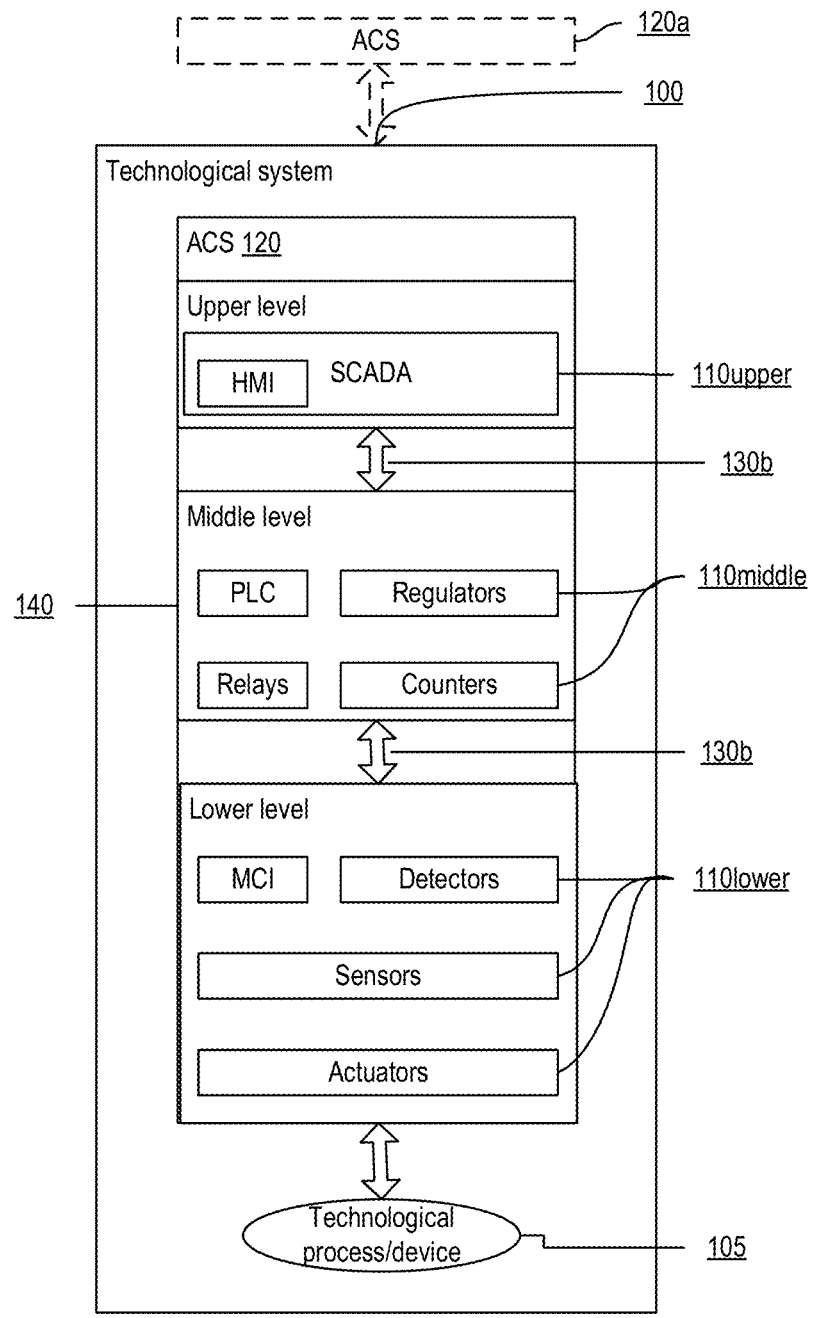
FIG. 1b illustrates a particular examplary implementation of a technological system in accordance with aspect of the present disclosure.

FIG. 1b illustrates a particular exemplary implementation of a technological system 100 in accordance with aspect of the present disclosure. The object of control 105 is a TP or a device; controlling actions are dispatched to the object of control 105, which actions are elaborated and realized by an automated control system (ACS) 120; in the ACS, three levels 140 are shown (upper level, middle level and lower level). The functions of the various levels are described below. Each of the upper, middle and lower levels consist control subjects 110 which are interconnected to each other by horizontal links (links within the level, not shown in the figure) and by vertical links 130b (links between levels). For clarity, the control subjects of the upper level are shown as $110_{upper}$, the control subjects of the middle level are shown as $110_{middle}$, and the control subjects of the lower level are shown as $110_{lower}$. The relationships are functional, i.e., in the general case, a change in a state of a control subject 110 on one level elicits changes in states of other control subjects 110 connected to it on the same level and on other levels. Information about the change in the state of the control subject is transmitted in a form of a signal along the horizontal and vertical links established between the control subjects, i.e., information on the change in the state of the particular control subject is an external action with respect to the other control subjects 110. The levels 140 in the ACS 120 are identified in accordance with the purpose of the control subjects 110. The number of levels may vary. For the physical linkage of the elements of the TS (i.e., 105 and 110) and the subsystems of the TS 100, wired networks, wireless networks, or integrated microcircuits are used; for the logical linkages between the elements of the TS (105, 110) and the subsystems of the TS 100, Ethernet, industrial Ethernet, or industrial networks are used. In these respect, the following industrial networks and protocols of various types and standards may be used: Profibus, FIP, ControlNet, Interbus-S, DeviceNet, P-NET, WorldFIP, LongWork, Modbus and others.

The upper level (the level of supervisory control and data acquisition, SCADA) is the level of dispatcher/operator control and includes at least the following control subjects $110_{upper}$: controllers which control computers and human-machine interfaces (HMI) (FIG. 1b shows the SCADA within a single control subject). This level is designed to track the states of the elements of the TS (105, $110_{upper}$), to obtain and compile information about the state of the elements of the TS (105, $110_{upper}$), and to correct the information if necessary.

The middle level (the CONTROL level) is the level of the controllers and includes at least the following control subjects: programmable logic controllers (PLC), counters, relays, regulators. The control subjects $110_{middle}$ of PLC type receive information from the control subjects of "measurement and control equipment" type and from the control subjects $110_{lower}$ of "detector" type as to the state of the object of control 105. The control subjects of PLC type elaborate (create) a controlling action in accordance with a programmed control algorithm for the control subjects of "actuator" type. The actuators realize the action directly (apply the action to the object of control) at the lower level. An actuator is part of an actuating device (equipment).

The lower level (the Input/Output level) is the level of control subjects such as: detectors and sensors, measurement and control instruments (MCI) which monitor the state of the object of control 105 and the actuators. The actuators act directly on the state of the object of control 105, in order to bring the state into compliance with a formal state, i.e., a state complying with a technological task, a technological chart or some other technological documentation (in the case of a TP) or a timetable (in the case of a device). On this lower level, the signals from the control subjects $110_{lower}$ of "detector" type are coordinated with the inputs of the control subjects of the middle level, and the controlling actions elaborated by the control subjects $110_{middle}$ of "PLC" type are coordinated with the control subjects $110_{lower}$ of "actuator" type, which implement the controlling actions. An actuator is part of an actuating device. An actuating device moves a regulating element in accordance with signals arriving from a regulator or a controlling device. Actuating devices are the last link in a chain of automatic control and in the general case consist of the units:

an amplifying device (contactor, frequency converter, amplifier, and so on);

an actuator (electric, pneumatic or hydraulic drive) with feedback elements (detectors of the position of an output shaft, a signaling of end positions, a manual drive, and so forth);

a regulating element (gates, valves, shutters, slide valves, and so forth).

Depending on the application conditions, actuating devices may differ in their design. The actuators and regulating elements are usually among the basic units of the actuating devices.

In a particular example, the actuating device as a whole is known as the actuator.

The enumerated control subjects ($110_{upper}$, $110_{middle}$, $110_{lower}$) of the different levels are the elements of the technological system (hereinafter referred to as the TS).

Figure 2:
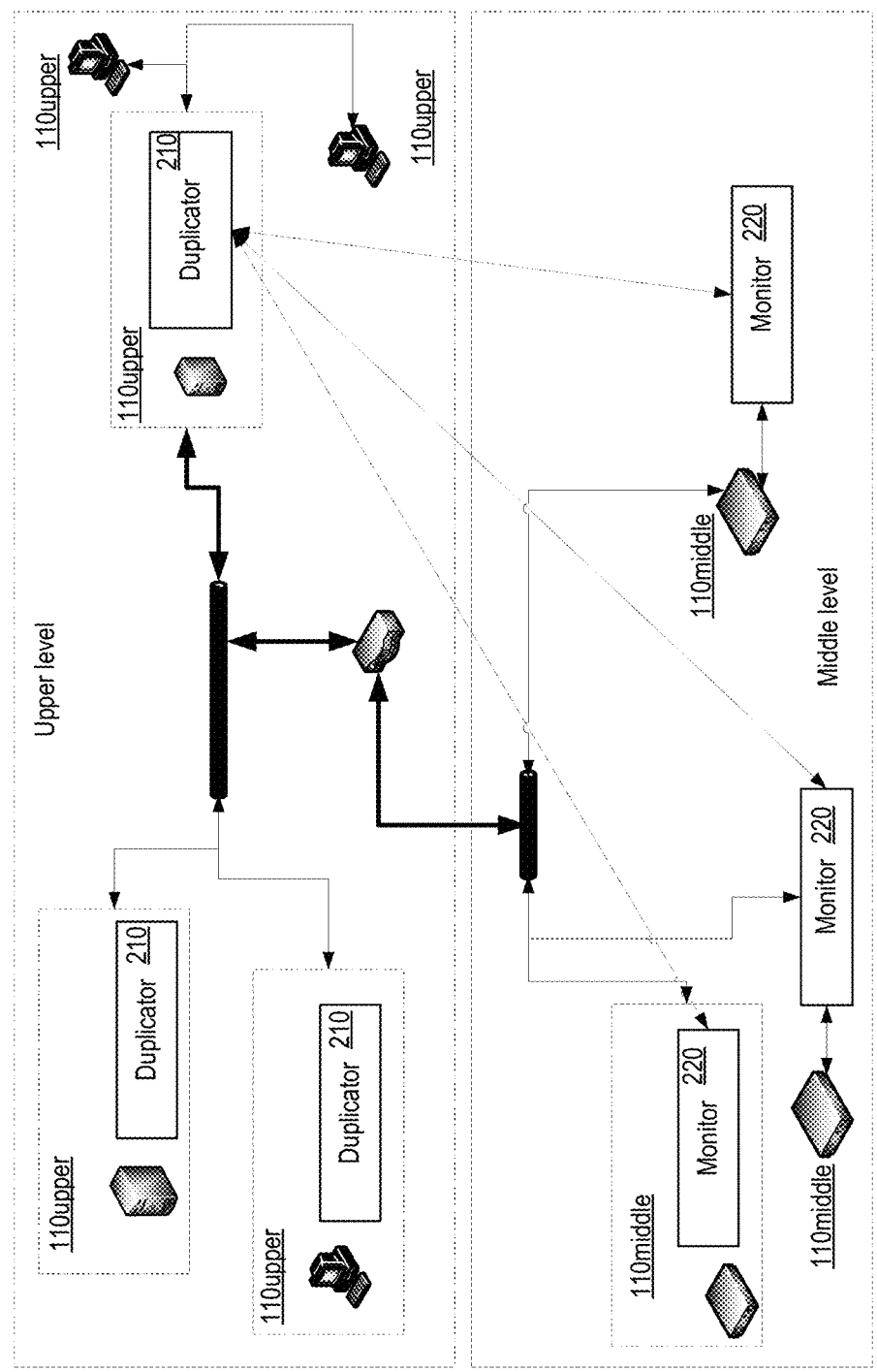
FIG. 2 illustrates an exemplary realization of a system for detecting anomalies in a technological system in accordance with aspect of the present disclosure.

FIG. 2 illustrates an exemplary realization of a system 200 for detecting anomalies in a technological system in accordance with aspect of the present disclosure.

In the general case, the upper-level TS elements $110_{upper}$ (computers on which the SCADA components are installed or engineering terminals) are combined into a separate protected data transmission network by systems and methods ordinarily known in the art of network systems. Furthermore, the upper-level TS elements $110_{upper}$ send data packets (such as packets containing commands of the technological processes and parameters of the commands) to the middle-level TS elements $110_{middle}$ (in the general case, programmable logic controllers). Because the technological processes are designed to last dozens of years, the middle-level TS elements $110_{middle}$ in the general case are less protected and often become obsolete. That is, the middle-level TS elements typically operate using obsolete unprotected data transmission protocols. These middle-level TS elements typically also have known vulnerabilities. It is presumed that the IP addresses of the middle-level TS elements $110_{middle}$ (such as the PLCs) are known. In order to interfere with the operations of the PLCs, a hacker must send information packets to the IP address of the PLC.

Thus, the method of the present disclosure addresses the problems described above by at least determining which packets are "trusted", and which are "untrusted". In general, a trusted data packet is a data packet dispatched by one TS element, such as an upper-level TS element $110_{upper}$, to another TS element, such as a middle-level TS element $110_{middle}$. In the context of the present disclosure, it is permissible to consider that data packets outgoing from the protected data transmission network are trusted. Trusted packets should be delivered to the middle-level TS elements $110_{middle}$.

In one aspect, the system 200 contains at least one duplicator 210 and at least one monitor 220.

The duplicator 210 comprises a protected operating system with hypervisor function support, and is designed for installation on a TS element (in a particular instance, on an upper-level TS element $110_{upper}$). The protected operating system with hypervisor function support is used to run the existing operating systems and applications of the upper-level TS elements $110_{upper}$, in a virtual environment. Using virtualization technology enables modifications to be made to components of the SCADA systems operating on the upper-level TS elements without modifying the software of the SCADA applications. For example, new attributes may be added to the components of the SCADA systems operating on the upper-level TS elements $110_{upper}$, without modifying the software of the SCADA applications.

In one aspect, the duplicator 210 installed on the upper-level TS element $110_{upper}$, intercepts outgoing data packets addressed to other TS elements (such as middle-level elements $110_{middle}$). The outgoing data packets are received from applications being executed in a guest operating system running in the virtual environment, from the guest operating system itself. In one aspect, the interception of the data packets is performed using virtualization methods.

In one aspect, the duplicator also determines the IP address of the middle-level TS element $110_{middle}$ to which the outgoing data packet is addressed.

In one aspect, each duplicator 210 establishes secure connections (indicated for one duplicator 210 in FIG. 2) with all monitors 220 located in the data transmission network, and sends to the monitors 220 information about each outgoing data packet that has been intercepted. In one aspect, the information sent to the monitors 220 includes the intercepted outgoing data packet itself in its initial or transformed form (for example, after encryption or packaging) and its check sum (such as MD5 or CRC). In one aspect, the information sent to the monitors 220 further includes: supplemental information obtained by the duplicator 210 as a result of the interception of the outgoing data packets. In one aspect, the duplicator 210 uses known cryptography methods of protection when sending the data to the monitors 220. In another aspect, an additional transformation or encryption of the intercepted outgoing data packets, by the duplicator 210, is provided by the hypervisor level.

In one aspect, if the IP address of the middle-level TS element $110_{middle}$ to which the outgoing data packet is addressed has been determined, the duplicator 210 sends the information to the IP address of the middle-level TS element $110_{middle}$ using a secure connection. In one aspect, the information as to the intercepted outgoing packets is also sent using the secure connection to monitors 220 located in a same data transmission network (or subnetwork) as the middle-level TS element $110_{middle}$ to which the outgoing data packet is addressed.

In one aspect, the outgoing data packet which has been intercepted by the duplicator 210 is not sent onward to the data transmission network, but remains in the memory of the hypervisor. After obtaining a confirmation from the monitor 220 as to the receiving of information about the intercepted data packet, the duplicator 210 sends the intercepted outgoing data packet saved in the memory of the hypervisor to the data transmission network in its original unchanged form.

In another aspect, for example, when no delays are permitted in sending of the data packets (i.e., the TS is working in real time), the intercepted outgoing packet is sent by the duplicator 210 to the data transmission network at once, i.e., the intercepted outgoing packet is sent to the data transmission network at the same time as the information being sent by the secure connection to the monitor 220.

Returning to FIG. 2, modern ACS may have several components of the SCADA systems operating on the upper-level TS elements $110_{upper}$ situated in different data transmission networks. In this scenario, each such network may contain a duplicator 210 performing the above described actions of intercepting an outgoing data packet and sending information about the intercepted data packet to the monitor 220.

The monitor 220, in one aspect, is implemented on a TS element 110. In another aspect, the monitor 220 is implemented on an upper-level TS element $110_{upper}$. In yet another aspect, the monitor 220 is implemented on a middle-level TS element $110_{middle}$.

In one aspect, the monitor 220 is situated topologically in the data transmission network so as to intercept all data packets addressed to the TS elements 110. In one aspect, the monitor 220 operates (is implemented) on an existing TS element 110, such as a middle-level TS element $110_{middle}$ or an upper-level TS element $110_{upper}$, the monitor 220 being an executable application or service. In yet another aspect, the monitor 220 is a protected operating system with hypervisor function support, designed for installation on the middle-level TS element $110_{middle}$. In another aspect, the monitor 220 is installed on an additional middle-level TS element $110_{middle}$ designed solely for the operation of the monitor 220.

As previously described, the monitor 220 receives, from the duplicator 210, information about the intercepted outgoing packets via a secure connection. After receiving the information about the intercepted outgoing packets, the monitor 220 sends a confirmation to the duplicator 210 as to the receiving of that information. Moreover, the monitor 220 intercepts incoming data packets which are addressed to the middle-level TS elements $110_{middle}$ by the data transmission network. In one aspect, the interception of the incoming data packets is performed using virtualization methods known in the art. In yet another aspect, the interception is performed without the use of virtualization methods. For example, the interception may be performed using a socket opened in a mode of unprocessed (or minimally processed) data (i.e., in RAW mode).

In one aspect, the monitor 220 compares the information received on the secure connection from the duplicator 210 regarding the intercepted outgoing packets with the intercepted incoming packets that are addressed to the middle-level TS elements $110_{middle}$ in the data transmission network.

In another aspect, when the intercepted outgoing data packets are sent to the data transmission network by the duplicator 210 at the same time as the information about the intercepted outgoing data packets using the secure connection, the monitor 220 compares the information received about the intercepted outgoing data packets with the intercepted incoming data packets within a pre-determined interval of time (such as 1 second). If an incoming data packet has been intercepted and no information is received from the duplicator 210 during the pre-determined interval of time about the intercepted incoming data packet, then the monitor 220 detects an anomaly in the technological system.

In another aspect, when the intercepted outgoing data packets are sent to the data transmission network by the duplicator 210 after receiving a confirmation from the monitor 220 of the reception of information about the intercepted outgoing data packets using the secure connection, the monitor 220 compares the intercepted incoming data packets to the received information. If an incoming data packet has been intercepted and no information is received from the duplicator 210, then, the monitor 220 detects an anomaly in the technological system.

When an anomaly is detected for the technological system, information about the detected anomaly may be sent, by the monitor 220, to the components of the SCADA systems operating on the upper-level TS elements $110_{upper}$. The information about the detected anomaly is provided to the components of the SCADA systems both for the purpose of notification and for enabling the SCADA systems to take further actions to deal with the detected anomaly. For example, mitigating steps may be taken to reduce the risk of damage to components and reduce the chance of data loss.

In one aspect, if the monitor 220 is located in the data transmission network topologically after a first middle-level TS element $110_{middle}$ and before a second middle-level TS element $110_{middle}$, and an anomaly is detected for the technological system, then the monitor 220 does not send the intercepted incoming data packet onward to the data transmission network—thereby counteracting the possible consequences of the resulting anomaly in the technological system. The middle-level TS element $110_{middle}$, in this exemplary aspect, does not receive the intercepted incoming data packet, which prevents a perturbing action on the middle-level TS element $110_{middle}$.

In yet another aspect, the monitor 220 may be located in the data transmission network on the same middle-level TS element $110_{middle}$ to which the intercepted incoming data packet was addressed. In this case, the monitor 220, as described above, counteracts the possible consequences of the resulting anomaly in the technological system.

An exemplary application of the method of the present disclosure is presented below. Suppose there is a building which is outfitted with an automated access system to the premises, a gymnasium, a swimming pool, and the building has at least a ventilation system and a fire suppression system. Suppose also the ACS and SCADA components are located in the data transmission network of the building in a protected environment (or in a protected subnetwork) yet intercommunicate with the programmable logic controllers which control the aforementioned systems, using the data transmission network. Moreover, the workers of the building and visitors may gain access to this same data transmission network. In practice, such data transmission networks exist rather often. The building are built without proper attention to IT security during their design or in consideration of savings material expenses during initial buildout.

Obviously, third parties may send data packets to the network which do not come from SCADA components and which may be received by the programmable logic controllers, which is an anomaly in the context of the method of the present disclosure. Thus, the present system, as described in the present disclosure, may be used to warn other components of the system about such anomalies. Thus, the duplicator 210 installed on the SCADA components intercept outgoing data packets and send the intercepted outgoing data packets to the monitor 220. Thus, the monitor 220 receives and compares all the incoming data packets addressed to the programmable logic controllers, making detection of anomalies possible. For example, if the data packet has been sent to the data transmission network not from a SCADA component, the anomaly may be detected and steps may be taken to counteract the effects. For instance, incoming data packets may be blocked.

Figure 3:
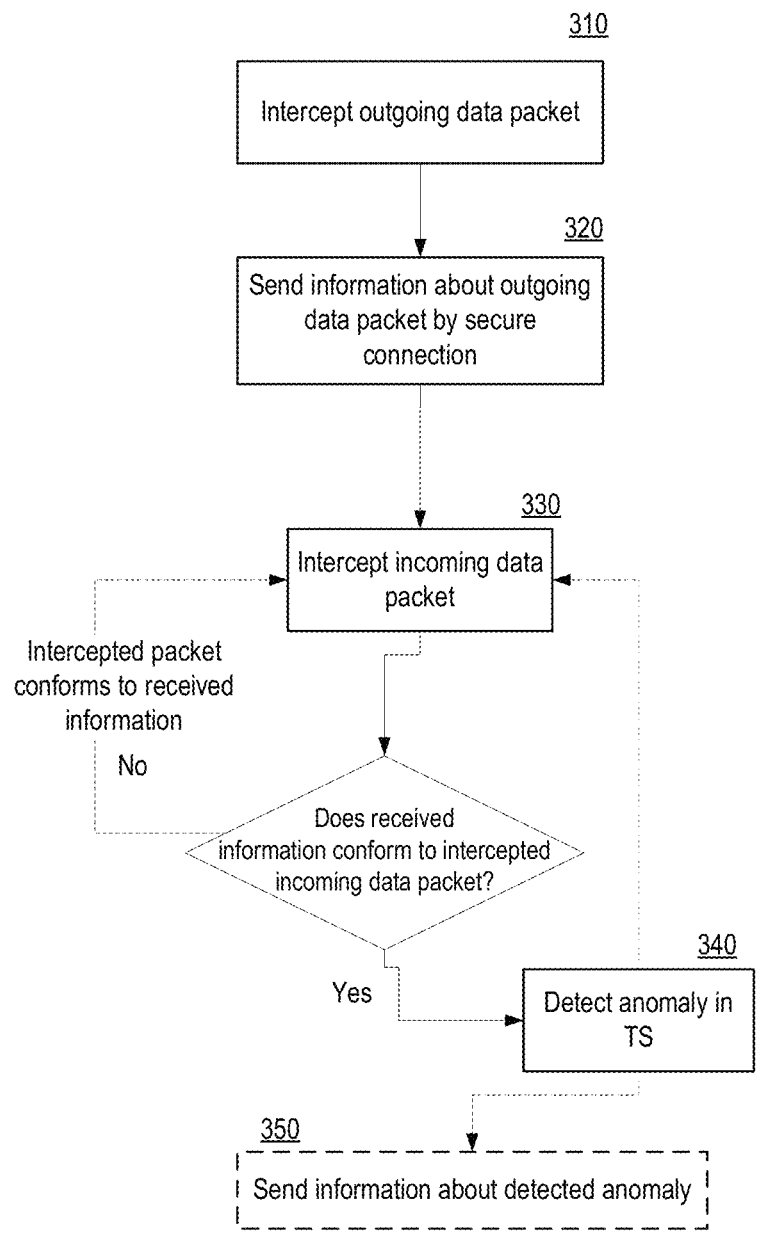
FIG. 3 illustrates an exemplary method for detecting anomalies in a technological system in accordance with aspects of the present disclosure.

FIG. 3 illustrates an exemplary method 300 for detecting anomalies in a technological system in accordance with aspects of the present disclosure. The method 300 may be implemented on a computing system that comprises any number of devices, e.g., the system 200 described above.

In step 310, the duplicator 210, running on an upper-level element of a technological system, e.g., $110_{upper}$, intercepts at least one outgoing data packet addressed to a middle-level element, e.g., $110_{middle}$, of the technological system. The upper-level element is running in a protected environment and the middle-level element is unprotected, e.g., runs unprotected data transmission protocols.

In one aspect, the duplicator 210, comprises a protected operating system with a hypervisor function support.

In yet another aspect, the upper-level element of the technological system comprises a SCADA component. In one aspect, the intercepting of the data packets is performed using virtualization techniques, e.g., virtualization techniques known in the art.

In step 320, the duplicator 210 sends information about the intercepted at least one data packet to a monitor 220 using a secure connection, wherein the monitor 220 is running on the middle-level element, $110_{middle}$, of the technological system. In one aspect, the duplicator 210 establishes at least one secure connection with each monitor 220 located in the data transmission network, and sends information about each intercepted outgoing data packet to the monitors 220 with which the duplicator 210 has established at least one secure connection.

In one aspect, the monitor 220 is a protected operating system.

In another aspect, the monitor 220 is situated in a same data transmission network in which the middle-level element, $110_{middle}$, of the technological system to which the intercepted at least one data packet is addressed is located. In one aspect, the monitor 220 is a protected operating system with a hypervisor function support that is designed for installation on the middle-level element, $110_{middle}$, of the technological system.

In step 330, the monitor 220 intercepts at least one incoming data packet. In one aspect, the intercepting of the incoming at least one data packet is performed using virtualization techniques known in the art.

In step 340, the monitor 220 detects an anomaly in the technological system when the intercepted incoming at least one data packet does not conform to the information about the intercepted at least one data packet received from the duplicator 210. For the detection of anomaly, the monitor 220 compares the information about the intercepted outgoing data packets received from the duplicator 210 on the secure connection with the intercepted incoming data packets addressed to the middle-level elements, $110_{middle}$, of the technological system in the data transmission network. If no anomaly is found, the method returns to step 330. In other words, an incoming data packet is intercepted and information about the intercepted data packet is obtained successfully from the duplicator 210. Thus, there is no anomaly detected.

In one aspect, in step 350, the monitor 220 sends information about the detected anomaly to the components of the SCADA systems operating on the upper-level elements, $110_{upper}$, of the technological system. In one aspect, the information about the detected anomaly is sent for notification purposes and/or for taking further steps to avert possible consequences of the detected anomaly in the technological system.

In one aspect, if an anomaly is detected, the method returns to step 330.

Figure 4:
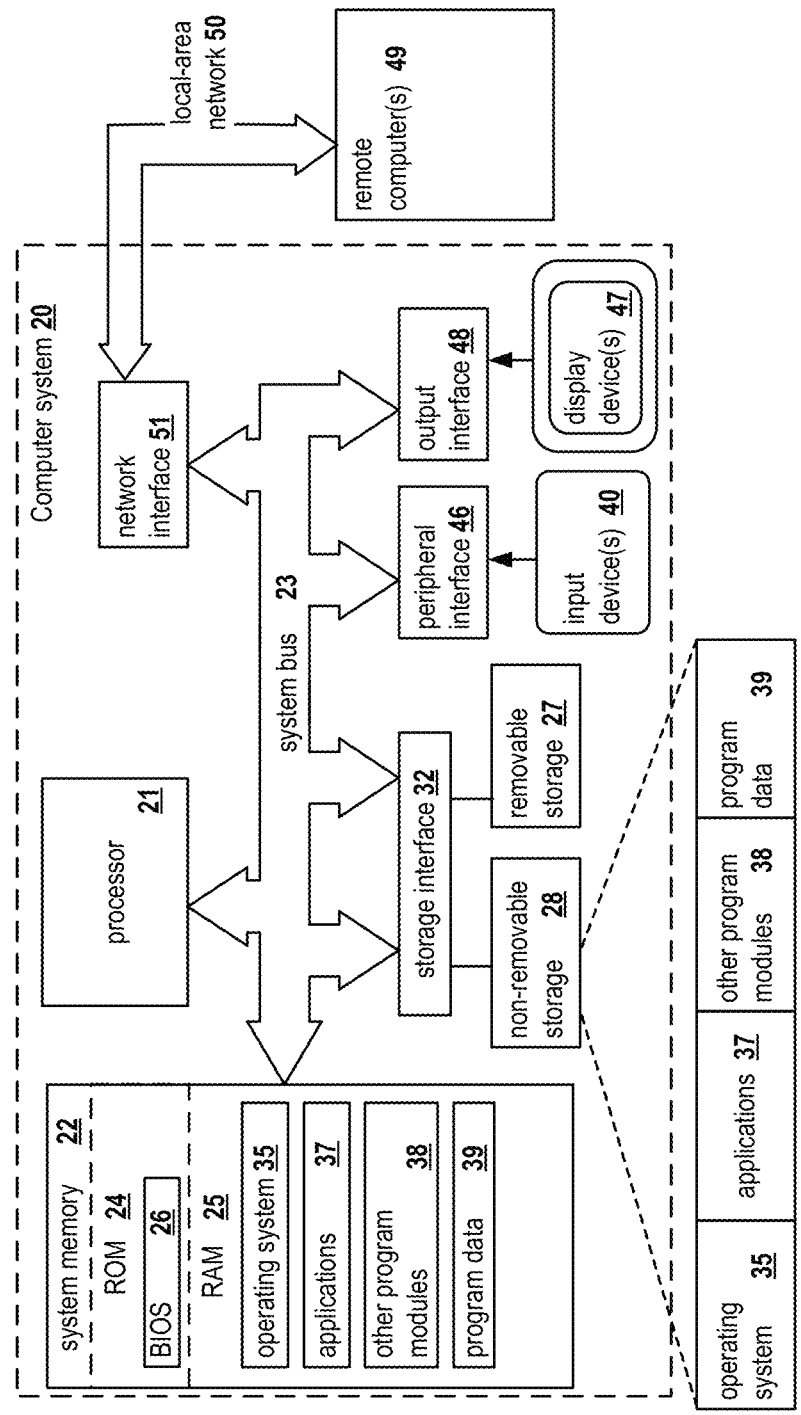
FIG. 4 presents an example of a general purpose computer system on which aspects of the present disclosure can be implemented.

FIG. 4 is a block diagram illustrating a computer system 20 on which aspects of systems and methods for detecting anomalies in a technological system may be implemented in accordance with exemplary aspects. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper- Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting anomalies in a technological system, the method comprising:
   intercepting, by a duplicator running on an upper-level element of the technological system from a guest operating system, at least one outgoing data packet addressed to a middle-level element of the technological system, the upper level element comprising a level of operator control including at least controls for controlling computers and human-machines interfaces;
   sending, by the duplicator, information about the intercepted at least one outgoing data packet to a monitor using a secure connection, the monitor running on the middle-level element;
   intercepting, by the monitor, at least one incoming data packet;
   comparing, by the monitor, the information received from the duplicator with the intercepted at least one incoming data packet; and
   detecting, by the monitor, an anomaly in the technological system when the intercepted at least one incoming data packet does not conform to the information received from the duplicator.

2. The method of claim 1, further comprising:
   sending, by the monitor, information about the detected anomaly to all upper-level elements of the technological system.

3. The method of claim 1, wherein the upper-level element is running in a protected environment and the middle-level element is using an unprotected data transmission protocol.

4. The method of claim 1, further comprising:
   establishing, by the duplicator, at least one secure connection with each monitor located in the data transmission network; and
   sending, by the duplicator, information about each intercepted outgoing data packet to the monitors with which the duplicator has established at least one secure connection.

5. The method of claim 1, wherein the monitor is a protected operating system.

6. The method of claim 1, wherein the monitor is located in a same data transmission network in which the middle-level element to which the intercepted at least one outgoing data packet is addressed is located.

7. The method of claim 1, wherein the upper-level elements of the technological system which operate in a protected environment comprise one or more of: supervisory control and data acquisition (SCADA) and programmable logic controller (PLC) devices.

8. A system for detecting anomalies in a technological system, comprising:
   at least one computing device comprising at least one hardware processor configured to:
      intercept, by a duplicator running on an upper-level element of the technological system from a guest operating system, at least one outgoing data packet addressed to a middle-level element of the technological system, the upper level element comprising a level of operator control including at least controls for controlling computers and human-machines interfaces;
      send, by the duplicator, information about the intercepted at least one outgoing data packet to a monitor using a secure connection, the monitor running on the middle-level element;
      intercept, by the monitor, at least one incoming data packet;
      compare, by the monitor, the information received from the duplicator with the intercepted at least one incoming data packet; and
      detect, by the monitor, an anomaly in the technological system when the intercepted at least one incoming data packet does not conform to the information received from the duplicator.

9. The system of claim 8, the processor further configured to:

send, by the monitor, information about the detected anomaly to all upper-level elements of the technological system.

10. The system of claim 8, wherein the upper-level element is running in a protected environment and the middle-level element is using an unprotected data transmission protocol.

11. The system of claim 8, the processor further configured to:
- establish, by the duplicator, at least one secure connection with each monitor located in the data transmission network; and
- send, by the duplicator, information about each intercepted outgoing data packet to the monitors with which the duplicator has established at least one secure connection.

12. The system of claim 8, wherein the monitor is a protected operating system.

13. The system of claim 8, wherein the monitor is located in a same data transmission network in which the middle-level element to which the intercepted at least one outgoing data packet is addressed is located.

14. The system of claim 8, wherein the upper-level elements of the technological system which operate in a protected environment comprise one or more of: supervisory control and data acquisition (SCADA) and programmable logic controller (PLC) devices.

15. A non-transitory computer readable medium storing thereon computer executable instructions for detecting anomalies in a technological system, including instructions for:
- intercepting, by a duplicator running on an upper-level element of the technological system from a guest operating system, at least one outgoing data packet addressed to a middle-level element of the technological system Previously Presented, the upper level element comprising a level of operator control including at least controls for controlling computers and human-machines interfaces;
- sending, by the duplicator, information about the intercepted at least one outgoing data packet to a monitor using a secure connection, the monitor running on the middle-level element;
- intercepting, by the monitor, at least one incoming data packet;
- comparing, by the monitor, the information received from the duplicator with the intercepted at least one incoming data packet; and
- detecting, by the monitor, an anomaly in the technological system when the intercepted at least one incoming data packet does not conform to the information received from the duplicator.

16. The non-transitory computer readable medium of claim 15, the instructions further comprising instructions for:
- sending, by the monitor, information about the detected anomaly to all upper-level elements of the technological system.

17. The non-transitory computer readable medium of claim 15, wherein the upper-level element is running in a protected environment and the middle-level element is using an unprotected data transmission protocol.

18. The non-transitory computer readable medium of claim 15, the instructions further comprising instructions for:
- establishing, by the duplicator, at least one secure connection with each monitor located in the data transmission network; and
- sending, by the duplicator, information about each intercepted outgoing data packet to the monitors with which the duplicator has established at least one secure connection.

19. The non-transitory computer readable medium of claim 15, wherein the monitor is a protected operating system.

20. The non-transitory computer readable medium of claim 15, wherein the monitor is located in a same data transmission network in which the middle-level element to which the intercepted at least one outgoing data packet is addressed is located.

21. The non-transitory computer readable medium of claim 15, wherein the upper-level elements of the technological system which operate in a protected environment comprise one or more of: supervisory control and data acquisition (SCADA) and programmable logic controller (PLC) devices.

* * * * *